United States Patent
Fernandez-Corbaton et al.

(10) Patent No.: US 7,450,541 B2
(45) Date of Patent: Nov. 11, 2008

(54) ACCESS CHANNEL WITH CONSTRAINED ARRIVAL TIMES

(75) Inventors: Ivan Jesus Fernandez-Corbaton, San Diego, CA (US); Franklin Peter Antonio, Del Mar, CA (US); Leonard Norman Schiff, San Diego, CA (US); Ahmad Jalali, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 674 days.

(21) Appl. No.: 10/952,970

(22) Filed: Sep. 28, 2004

(65) Prior Publication Data

US 2005/0201335 A1    Sep. 15, 2005

Related U.S. Application Data

(60) Provisional application No. 60/551,689, filed on Mar. 9, 2004.

(51) Int. Cl.
| H04Q 7/00 | (2006.01) |
| H04Q 7/28 | (2006.01) |
| H04B 7/216 | (2006.01) |
| H04J 3/06 | (2006.01) |
| H04J 3/16 | (2006.01) |

(52) U.S. Cl. ............... 370/329; 370/330; 370/335; 370/341; 370/350; 370/437; 370/441

(58) Field of Classification Search ......... 370/447–449, 370/431–437, 310, 320, 324, 335–338, 341–350, 370/441–443, 479, 485, 491, 496, 507, 509, 370/512, 328–329, 263, 280, 294, 301, 312–313, 370/458, 461; 375/145–150, 354–370, 135–143; 455/550.1, 556.2, 561, 464, 509, 450–451, 455/515–517, 224, 455, 158.1, 456.1–456.6, 455/500, 502, 524–525
See application file for complete search history.

(56) References Cited

U.S. PATENT DOCUMENTS 5,937,351 A * 8/1999 Seekins et al. ............... 455/434
(Continued)

FOREIGN PATENT DOCUMENTS

GB    2391747    11/2004
(Continued)

*Primary Examiner*—Meless N Zewdu
(74) *Attorney, Agent, or Firm*—Amin, Turocy & Calvin, LLP

(57) ABSTRACT

Systems, methods and apparatus for configuring and accessing a random access channel in a CDMA communication system are disclosed. The number of users supported by a random access channel can be optimized by assigning a distinct time of arrival to each of a plurality of users. Each of the users can be time synchronized and can transmit data at a time that compensates for a propagation delay to allow the data to arrive at the destination receiver at the assigned time. In a CDMA system, each of the users can transmit data that is spread with the same spreading code, provided the cross correlation properties of the code are sufficient to allow identification of a source that is time offset relative to another user. The time of arrival can be determined based on the number of active users, and can be assigned as often as each transmission by each user.

39 Claims, 6 Drawing Sheets

U.S. PATENT DOCUMENTS

| | | | |
|---|---|---|---|
| 5,956,642 A * | 9/1999 | Larsson et al. | 455/449 |
| 6,393,007 B1 * | 5/2002 | Haartsen | 370/337 |
| 6,522,887 B2 * | 2/2003 | Larsson et al. | 455/456.5 |
| 6,563,856 B1 * | 5/2003 | O'Shea et al. | 375/130 |
| 6,711,357 B1 * | 3/2004 | Brewer et al. | 398/54 |
| 6,781,976 B1 * | 8/2004 | Sonning et al. | 370/335 |
| 7,126,967 B2 * | 10/2006 | Sonning et al. | 370/510 |
| 7,215,652 B1 * | 5/2007 | Foley et al. | 370/319 |
| 2002/0191566 A1 | 12/2002 | Fogel | |
| 2003/0114172 A1 | 6/2003 | Soliman | |
| 2004/0131039 A1 * | 7/2004 | Benveniste | 370/346 |
| 2005/0025114 A1 * | 2/2005 | Ware et al. | 370/346 |

FOREIGN PATENT DOCUMENTS

WO        9318601        9/1993

* cited by examiner

ACCESS CHANNEL WITH CONSTRAINED ARRIVAL TIMES

CLAIM OF PRIORITY UNDER 35 U.S.C. §119

The present Application for Patent claims priority to Provisional Application No. 60/551,689 entitled "CDMA-ALOHA RANDOM ACCESS CHANNEL WITH CONSTRAINED ARRIVAL TIMES" filed Mar. 9, 2004, and assigned to the assignee hereof and hereby expressly incorporated by reference herein.

BACKGROUND OF THE DISCLOSURE

1. Field of the Invention

The disclosure relates to the field of electronic communications. More particularly, the disclosure relates to the field of configuring and interfacing with access channels in communication systems.

2. Description of Related Art

During the last decade many cellular communications standards have selected orthogonal and non-orthogonal Code Division Multiple Access (CDMA) physical layer interfaces.

In the context of many to one communications where several users try to send information to a central receiver, non-orthogonal CDMA has been the option of choice. The reverse links of cdma2000 and WCDMA are good examples of this.

The fundamental characteristic of a non-orthogonal CDMA channel is that it is self-interference limited. The degradation in the communication between a user and the central receiver is primarily due to other users of the system that are simultaneously accessing the channel at the same frequency band. Each concurrent transmitter is only distinguishable by the code it utilizes. Furthermore, for the system to work, the energy that is present in the medium due to other users transmissions needs to have practically the same statistical properties as white noise. It is this randomness that allows several users to successfully transmit information at the same time in the same frequency band as long as the number of simultaneous users does not exceed some maximum N. Typically, a different transmission code is assigned to each user by the central entity. The special properties of these codes assure the desired characteristics of the interference.

In a circuit-switched CDMA channel like the reverse link of cdma2000, the actual number of users U present in the system is of the same order of magnitude as the number N of maximum allowed simultaneous users for successful transmission. This connection oriented configuration is well suited for voice-like applications with steady traffic needs. For instance, a typical voice encoder produces 192 bits every 20 milliseconds. Furthermore, the transmission of frames is arranged in a way such that once the receiver has acquired a particular user it knows exactly when to expect the next information frame. Conceptually the receiver is comprised of U parallel receivers, each acting in one of the codes. For typical cdma2000 deployments, U is approximately 60, which may be implemented in a relatively low complexity receiver.

For a different type of user traffic, like web browsing, the per user utilization of the channel is much more sporadic, so that the total number of users U that a system can effectively support is much larger than the allowed number of simultaneous transmissions N. Some systems are being proposed where N~30 and U~15000. Furthermore, the sparse nature of the traffic suggests a non connection oriented Aloha type access protocol. In an Aloha based access channel, each user accesses the channel whenever the user has data to transmit. If multiple users attempt to concurrently access the same channel space, a collision may occur and both transmissions may be unsuccessful.

In the Aloha based access channel, the time of arrival of the information frames is unknown at the receiver with a probability distribution that is flat over time. This adds an extra dimension (arrival time) to the demodulator complexity since every possible transmission code has to be continuously checked for the arrival of packets. In practical terms it is much more complex to demodulate a signal transmitted using a given code when the arrival of the signal is unknown. The individual demodulators that are needed for the CDMA-Aloha channel are orders of magnitude more complex than the ones mentioned above for the connection oriented protocols.

It is in principle undesirable, in terms of receiver complexity, to assign 15000 different codes and have 15000 parallel demodulators. One possible approach is to have a smaller set of codes C<U from where the users randomly choose one every time they want to start a transmission. Limiting the number of access codes increases the probability that collisions can occur.

While simultaneous transmissions are allowed, two different transmitters using the same code and arriving at the receiver at the same time will not interfere randomly with each other. The mixing of the information symbols on the same code at the same time and frequency band will likely cause the loss of both packets. This can be solved by having a sufficiently large set of codes C such that collisions are very unlikely. However, receiver complexity increases with an increase in the number of available codes C.

It is desirable to have an access channel configuration and protocol within a communication system that allows for a large number of active, intermittent, users while reducing the probability of collision for data transmissions from distinct users, and maintaining or reducing the complexity of an associated receiver.

BRIEF SUMMARY OF THE DISCLOSURE

Systems, methods and apparatus for configuring and accessing a random access channel in a CDMA communication system are disclosed. The number of users supported by a random access channel can be optimized by assigning a distinct time of arrival to each of a plurality of users. The different times of arrival for different users can be as small as a single chip.

Each of the users can be time synchronized and can transmit data at a time that compensates for a propagation delay to allow the data to arrive at the destination receiver at the assigned time. In a CDMA system, each of the users can transmit data that is spread with the same spreading code, provided the cross correlation properties of the code are sufficient to allow identification of a source that is time offset relative to another user. Alternatively, the users can be assigned a code from a predetermined list of code sequences. The time of arrival can be determined based on the number of active users, and can be assigned as often as each transmission by each user.

A receiver configured to receive the time constrained transmissions from the plurality of users can reduce the search space for each of the plurality of active users to a predetermined spreading code and a predetermined time window corresponding to the user. The assigned times of arrival reduces the receiver complexity while allowing the system to support more users than can be supported by a random access channel that uses unconstrained channel access, such as Aloha.

The disclosure includes a method of allocating access to a channel. The method includes determining a transmission cycle timing, determining a time of arrival within the transmission cycle to assign to a user terminal from a plurality of active user terminals, and transmitting the time of arrival to the user terminal to allocate the channel to the user terminal beginning at the time of arrival.

The disclosure also includes a method of allocating access to a channel. The method includes receiving a request for access to the channel from a user terminal, synchronizing a time base with the user terminal, determining a transmission cycle having a duration proportional to a CDMA chip duration, determining a time of arrival occurring at a chip boundary within the transmission cycle, and transmitting the time of arrival to the user terminal to allocate the channel to the user terminal beginning at the time of arrival.

The disclosure also includes a method of transmitting data in a channel. The method includes requesting access to the channel, receiving a time of arrival assignment in response to the request, and transmitting a data block at a time offset from the time of arrival such that the initial portion of the data block arrives at a receiver at the assigned time of arrival.

The disclosure additionally includes a method of receiving data in a channel. The method includes determining a time of arrival within a transmission cycle assigned to a user terminal, receiving transmissions from a plurality of active user terminals, searching within a time window that includes the time of arrival for transmissions from the user terminal, and receiving a data block from the user terminal.

The disclosure also includes an apparatus for operating over a constrained arrival time channel. The apparatus includes a data buffer configured to store a data block, a data modulator coupled to the data buffer. The data modulator is configured to direct sequence spread data within the data block using a code to produce modulated data. The apparatus also includes a transmitter configured to receive the modulated data from the data modulator and selectively transmit the modulated data, and a transmit timing module coupled to the transmitter, and configured to receive an arrival time assignment and control the transmitter to transmit the modulated data at a time offset relative to the arrival time assignment such that the transmitted data initially arrives at a receiver at substantially the arrival time assignment.

The disclosure also includes an apparatus for operating over a constrained arrival time channel. The apparatus includes a transmission cycle module configured to determine a transmission cycle timing, a time boundary module configured to determine an arrival time within the transmission cycle assigned to a user terminal, and a receiver configured to receive a plurality of transmissions from a plurality of active user terminals, and configured to search the plurality of transmissions within a time window that encompasses the arrival time for transmissions from the user terminal.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Figure 1:
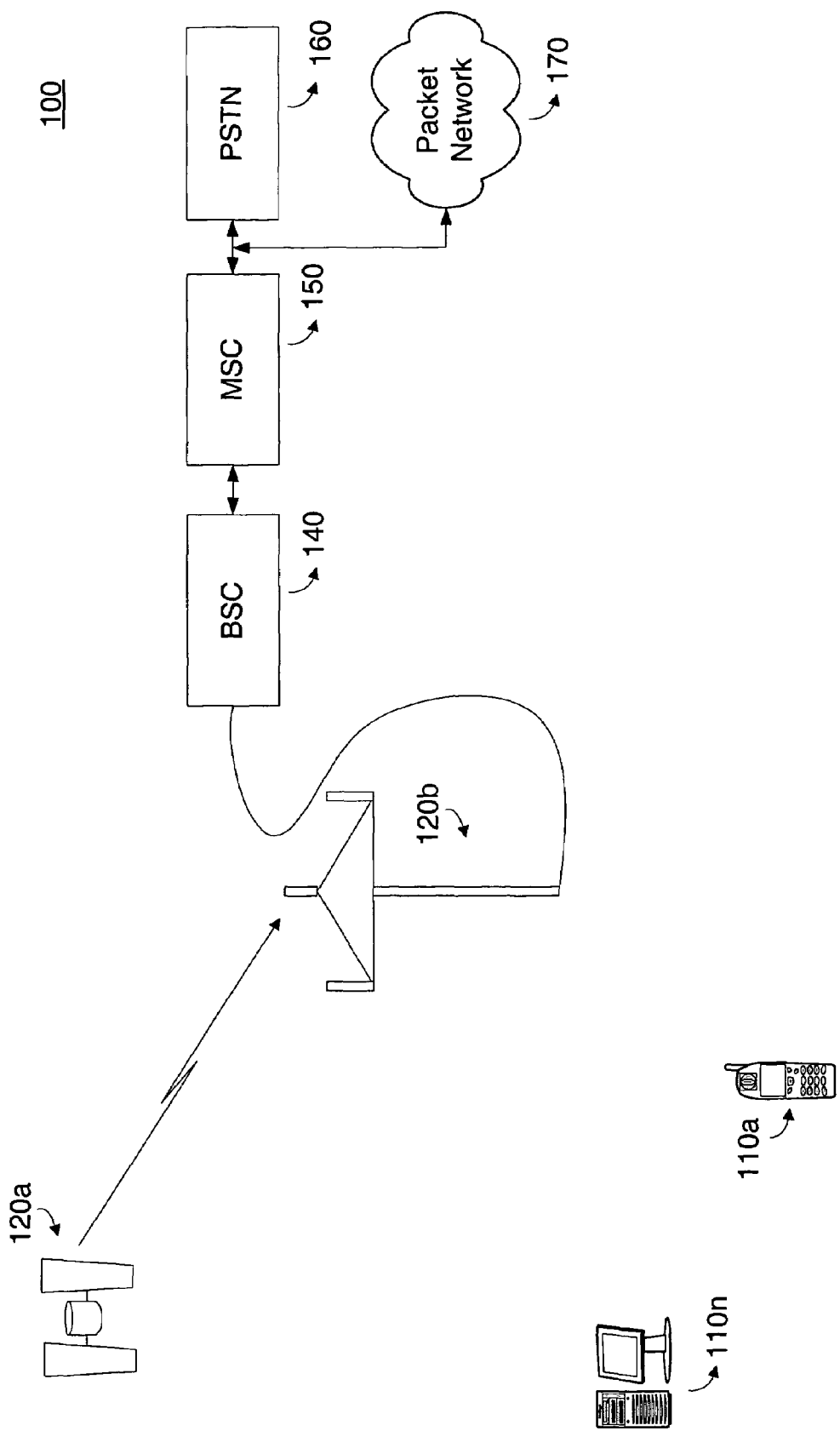
FIG. 1 is a functional block diagram of an embodiment of a wireless communication system implementing a time constrained access channel of the disclosure.

A wireless communication system having an access channel with constrained arrival times is disclosed as are apparatus configured to operate over the access channel, and methods of interfacing with the access channel. The wireless communication system can implement an access channel in which the arrival time of a transmission from a particular user terminal is constrained to a predetermined arrival time.

The arrival time can be selected from a plurality of predetermined arrival time boundaries and may be determined in part based on the number of active users on the channel. For example, the communication system may assign an arrival time to a particular user terminal modulo the number of active users on the channel. In another embodiment, the communication system may assign an arrival time to a particular user terminal modulo a predetermined number. In other embodiments, the communication system may also randomize the arrival time assigned to each of the users. The randomization may occur for each transmission or may occur based on a number of transmissions or a time period. The communication system may transmit the arrival time corresponding to a particular user prior to each interval or at some other interval that may be based on the manner in which the communication system determines the arrival time.

A user terminal may initially contact a base station to establish an active session over the channel by communicating over an overhead channel that may be configured as a random access channel. The user terminal may access the overhead channel a limited number of times per active communication session, such as for example, initial set up and termination of the communication session. The random access channel may encompass the same frequency band as the constrained arrival time channel. However, the user terminal typically is not time synchronized with the base station prior to establishing communications with it. Alternatively, the random access channel may be in a frequency band that partially overlaps, or is distinct from, the frequency band of the constrained arrival time channel. Because the user terminal communicates a relatively small number of times over the overhead channel, there may be a low likelihood of a collision with a transmission from another user terminal. The user terminal can synchronize a time base with the communication system and set up the active communication session over the overhead channel and can be assigned an arrival time for transmissions over the time constrained channel.

Constraining the arrival time of a user transmission simplifies the receiver configuration. At each arrival time epoch, the receiver has knowledge as to which user terminal from a limited number of active user terminals is assigned to the arrival time epoch. The receiver can be configured to search a predetermined time window and an associated code for CDMA systems. The number of codes can be significantly reduced compared to the number of codes required for a non-orthogonal CDMA random access channel, and can be reduced to as few as one code for all users.

FIG. 1 is a functional block diagram of an embodiment of a wireless communication system 100 implementing a time constrained access channel. The system 100 includes one or more fixed elements that can be in communication with one or more user terminals 110a-110n. A user terminal, for example 110a, can be configured to operate with different communication protocols over the forward link and the reverse link. The forward link refers to the communication link from the base station 120b to a user terminal 110a. The reverse link refers to the communication link from a user terminal, for example 110a, to a base station 120b. The user terminal 110 can be a portable unit, a mobile unit, or a stationary unit. The user terminal 110 may also be referred to as a mobile station, a mobile unit, a mobile terminal, user equipment, a portable, a phone, and the like.

Although only two user terminals 110a-110n are shown in the wireless communication system 100, the wireless communication system 100 can be configured to support a first number N of simultaneous transmissions and a second number U of active users that sporadically transmit to the base station 120b. The following description refers to a particular user terminal 110a for the sake of clarity. It is understood that the descriptions apply equally to all user terminals 110a-110n within the coverage area of the wireless communication system 100.

In one embodiment, the user terminal 110a communicates directly with one or more base stations 120b, although only one is depicted in FIG. 1. In this embodiment, the base station 120b is shown as a sectored cellular tower. The user terminal 110a will typically communicate with the base station 120b that provides the strongest signal strength at a receiver within the user terminal 110a.

In another embodiment, the user terminal 110a communicates, via an earth station, with a satellite 120a. The earth station may be internal to the user terminal 110a or may be external (not shown) to the user terminal. The satellite 120a communicates with a base station 120b, typically referred to as a ground station or gateway. The user terminal 110a transmits the reverse link signal to the satellite 120a via the earth station and the satellite 120a relays the reverse link signal to the base station 120b. The base station 120b can be configured to transmit the forward link signal to the satellite 120a and the satellite 120a can be configured to relay the forward link signal to the user terminal 110a.

The base station 120b, whether communicating directly with the user terminals 110a-110n or indirectly via a satellite 120a, can be coupled to a Base Station Controller (BSC) 140 that routes the communication signals to and from the appropriate base station 120b. The BSC 140 is coupled to a Mobile Switching Center (MSC) 150 that can be configured to operate as an interface between the user terminal 110a and a Public Switched Telephone Network (PSTN) 160 or some other network, which may be a packet network 170. In one embodiment, the packet network 170 can be a Wide Area Network (WAN) such as the Internet. Therefore, the MSC 150 can also be coupled to the PSTN 160 and the packet network 170. The MSC 150 can also be configured to coordinate inter-system handoffs with other communication systems.

The wireless communication system 100 can be configured to implement a channel having constrained arrival times on the reverse link because of the structure of the reverse link where numerous user terminals 110a-110n may each have an active communications session with the same base station 120b.

Figure 2A:
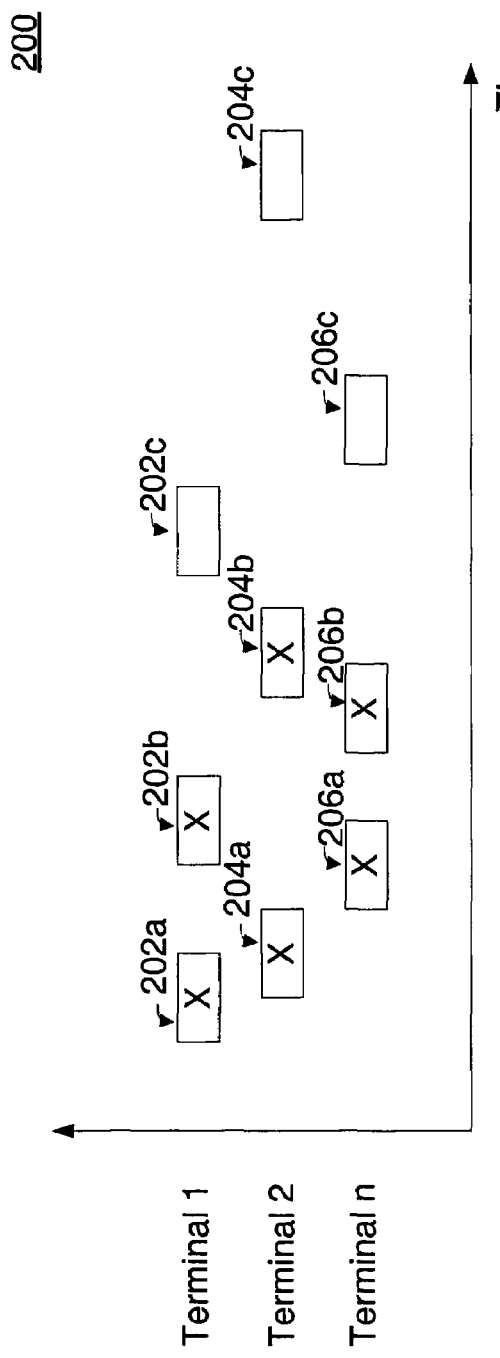
FIGS. 2A-2B are timing diagrams of embodiments of an Aloha random access channel and a time constrained access channel according to an embodiment of the disclosure.

The user terminal 110a initially communicates with the wireless communication system 100 and requests access to the channel with constrained access times. A user terminal 110a may initially communicate with the base station 120b over a random access overhead channel. The random access overhead channel can be in the same or different frequency bands as the constrained arrival time channel. The wireless communication system 100 may implement a protocol such as an Aloha protocol for the random access overhead channel. FIG. 2A is a timing diagram 200 of an Aloha random access channel showing the transmissions from three different user terminals attempting to communicate with a base station. In the example of FIG. 2A, the first user terminal experiences two collisions 202a and 202b before a successful transmission occurs. Similarly, a second user terminal experiences two collisions 204a and 204b before successful transmission occurs. Additionally, a third user terminal experiences two collisions 206a and 206b before a successful transmission occurs. Of course, the number of collisions experienced by any one user terminal is not limited to two.

Although FIG. 2A shows each terminal experiencing collision and unsuccessful attempts to access the channel, the sparse nature of communications over the random access channel may substantially reduce the probability of collisions. The random access channel may be desirable for initial set up because user terminals 110a-110n may be asynchronous with the wireless communication system 100 and may not have the ability to send a request at a predetermined arrival time.

The user terminal 110a may also synchronize with the wireless communication system 100 after requesting set up of an active session over the channel having constrained access time. The user terminal 110a may synchronize with the wireless communication system 100 using any one of various synchronization techniques. For example, the user terminal 110a may synchronize with the wireless communication system 100 in accordance with the techniques described in U.S. patent application Ser. No. 10/428,953 entitled ORTHOGONAL CODE DIVISION MULTIPLE ACCESS ON RETURN LINK OF SATELLITE LINKS, filed May 1, 2003, assigned to the assignee of the present application, and hereby incorporated herein in its entirety.

Once the user terminal 110a is synchronized with the wireless communication system 100, the wireless communication system can determine a time of arrival for data transmitted by the user terminal 110a and may assign the time of arrival to the user terminal 110a. The wireless communication system 100 can communicate the time of arrival assignment to the user terminal 110a, for example, using a forward link channel.

The wireless communication system 100 can be configured to assign to the active user terminals, for example 110a and 110n, different arriving times instead of different codes. Thus, the wireless communication system 100 can be configured to assign U different times of arrival to each of U distinct user terminals. The wireless communication system 100 can be configured to assign a time epoch for the time of arrival that is chosen from a set of uniformly spaced time boundaries. Alternatively, the time epoch for the time of arrival may be irregularly spaced or may be randomly determined.

In one embodiment, a transmission from a particular user terminal 110a in a CDMA based system is allowed to arrive at the base station 120b starting at any chip in the i-th position modulo U. In other words, each user terminal 110a-110n (u) can be configured to have a transmission arrive at the receiver at any chip boundary $b_u$ of the set:

$$b_u \epsilon u + kU \quad k \epsilon \{0, 1, 2 \ldots\} \quad (1)$$

Many variations on the embodiment are possible and/or desirable and the actual implementation may be determined based on design tradeoffs within the system. For example, the wireless communication system 100 may assign times of arrival that are modulo the number of active user terminals 110a-110n. Alternatively, the wireless communication system 100 may assign arrival times modulo a predetermined constant number. If the number of active users exceeds the predetermined constant modulus, the wireless communication system may implement a priority scheme to ensure all users terminals are eventually assigned an arrival time.

In an embodiment, the wireless communication system 100 can be configured to determine and assign times of arrival such that the transmissions from no two users simultaneously arrive at the receiver. In such an embodiment, the whole population of user terminals 110a-110n can effectively employ a single code provided that the code has pseudorandom properties when cross correlated with shifted versions of itself. Codes with such properties may be obtained using a Linear Feedback Shift Register (LFSR). With this transmit strategy, the probability of collision is effectively reduced to zero.

In the embodiment where one code is used throughout the whole user terminal population 110a-110n, the receiver in the base station 120b becomes simpler because the code is known. Furthermore, the instances of time where the receiver needs to look for a particular user's transmission are now a discrete set of hypothesis, hence reducing complexity in this dimension as well.

A constrained arrival time embodiment introduces a latency on the channel that may not be present in a pure CDMA-Aloha scheme, where terminals transmit at their discretion. Such latency is determined by a transmission cycle, which can be the spacing in chips between a user's two consecutive transmission arrival times. In one of the embodiment described above, every cycle of U chips each user terminal gets one opportunity to transmit, so the latency that a single packet experiences is a uniform random variable with parameter U.

Note that, even for large values of U~15000, the latency introduced is on the order of few milliseconds when chip rates are on the order of few megachips per second. Some digital communications systems like the ones using geostationary satellites have inherent propagation delays on the order of hundreds of milliseconds without even accounting for additional delays that the end to end communication link may introduce, for example, from internet routers. The percentage increase in latency of the constrained arrival time access implementation is, in such systems, extremely small.

Figure 2B:
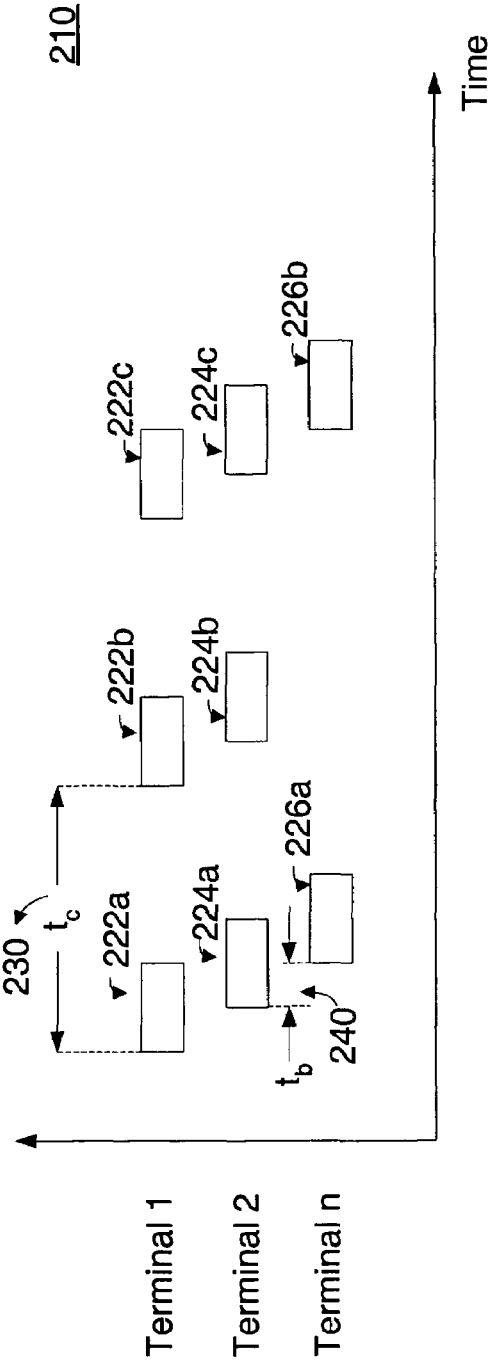

FIG. 2B is a timing diagram 210 of an example of a constrained arrival time channel. The timing diagram 210 of FIG. 2B shows three active user terminals, each transmitting data block arriving at a constrained arrival time. The first user terminal transmits data blocks 222a-222c that arrive at the assigned arrival times assigned to the first user terminal. Although only three transmissions of data blocks 222a-222c are shown, it is understood that the user terminal may continue to transmit data blocks arriving at the assigned times until the user terminal relinquishes the channel. The time between successive transmissions, $t_c$, is the transmission cycle. In the example of FIG. 2B, the time epoch assigned to the first user terminal is the same in each transmission cycle.

The transmission cycle 230 shown in the example of FIG. 2B has a duration greater than is required to cycle through all user terminal transmissions. Where the transmission cycle 230 is a multiple of the minimum time increment, that is $t_c = D \times t_b$, the assigned arrival time can be determined as a time assignment modulo D. Additionally, although FIG. 2B shows that the duration of a data block, for example 222a, is less than the duration of the transmission cycle 230, the duration of a data block 222a may exceed the duration of the transmission cycle. In such a situation, the receiver may not need to search for transmissions from the user terminal at the assigned time epoch because it is already receiving transmissions from the user terminal. Additionally, the system may not need to transmit a new time epoch assignment to the user terminal if the duration of a data block exceeds the duration of the transmission cycle.

Similarly, a second user terminal transmits data blocks 224a-224c that arrive at the assigned arrival times assigned to the second user terminal, and the duration of each data block may be shorter or longer than the duration of the transmission cycle. Similarly, the time epoch assigned to the second user terminal is the same in each transmission cycle.

A third user terminal transmits data blocks 226a-226b that arrive at the assigned arrival times assigned to the third user terminal. The time epoch assigned to the third user terminal is the same in each transmission cycle. However, the third user terminal has no data to transmit in the second transmission cycle, and thus there is no data to receive at the base station.

The time increment 240, $t_b$, between successive time epoch assignments may be fixed or may be variable. The minimum time increment 240 can be determined based on the level of synchronization and the configuration of the user terminals.

For example, in a wireless communication system in which the user terminals are stationary, and where no significant multipath signal components are present at the base station, the minimum time increment can be made relatively small. For example, the minimum time increment 240 can be the duration of one CDMA chip, 2 chips, 3 chips, 4 chips, 5 chips, 10 chips, and the like, or some other increment of time.

In other embodiments, the user terminals may be mobile or portable or substantial multipath signal components may arrive at the base station. In such an embodiment, the minimum time increment may be made larger to allow the significant multipath components from a first user terminal to arrive before the assigned arrival time of a second user terminal.

In the embodiment discussed above where the arrival time of each user is always the same chip number modulo D, there is a chance for an undesired phenomenon to occur. It can be analytically shown that data blocks that start in different time epochs can have persistently different levels of interference. For example, in the timing diagram example of FIG. 2B, a substantial portion of the data block transmission from the third user terminal, for example 226a, experiences no other interference sources from other user terminals. The overall consequence is a decrease in system capacity. One solution to this consequence is for the wireless communication system to assign a time epoch to each user terminal that changes every transmission cycle, or D number of chips. The continuous permutation makes the interference more evenly distributed among epoch times. The process of allocating the time epochs can be random, pseudorandom, or can follow a predetermined sequence or algorithm.

In a CDMA-Aloha channel, the receiver at the base station has no knowledge of which user terminal is transmitting. Typically, the identity of the sender is only uncovered after the information frame has been properly decoded. In an embodiment where the user terminals only broadcast sporadically, the base station is unable to determine who the sender was when there is a decoding error. With the constrained arrival time configuration, the receiver at the base station has the knowledge of which user terminal is transmitting the data block. If a decoding error occurs such information can be used, for example, to update a per user power control loop, or inform the particular user of the fact that there has been a packet loss. CDMA networks typically rely on a closed loop control of the user terminal transmit power. The wireless communication system can use a power control loop to instruct the user terminal transmitter to increase its transmit power if its transmitted data are not being correctly received.

Figure 3:
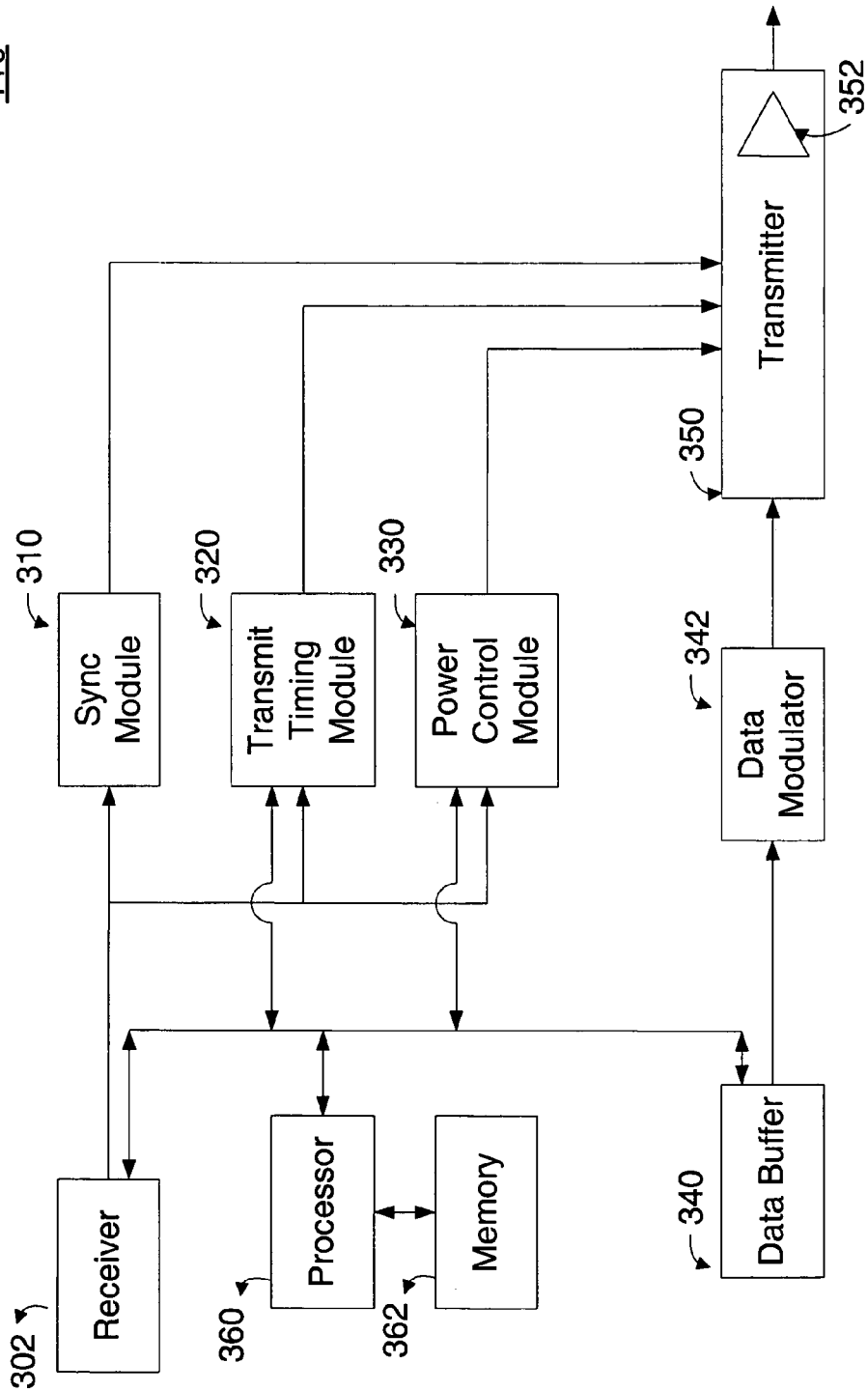
FIG. 3 is a functional block diagram of an embodiment of a base station configured to manage a time constrained access channel of the disclosure.

FIG. 3 is a functional block diagram of an embodiment of a user terminal 110 configured to operate in a constrained arrival time channel. The user terminal 110 can be, for example, one of the user terminals 110a or 110n shown in the embodiment of FIG. 1. Only those portions of the user terminal 110 relevant to the present disclosure are shown and described for the sake of clarity.

The user terminal 110 includes a receiver 302 that is configured to receive forward link transmissions from one or more base stations. As previously discussed in relation to FIG. 1, the receiver 302 may be configured to receive the forward link transmission transmitted by a base station or may receive forward link transmissions that are relayed by an intermediate element, such as a satellite. The receiver 302 can be configured to receive data and instructions from the wireless communication system. The instructions and associated data may be transmitted using an overhead channel and can include parameters relating to the time epoch assignment for the constrained arrival time channel. Other user data may be transmitted over a traffic channel. Alternatively, some or all of the control data and instructions may be transmitted over the forward link traffic channels.

The receiver 302 can direct the instructions and data received over the overhead channels to the appropriate modules. The output of the receiver 302 can be coupled to, for example. a sync module 310, a transmit timing module 320 and a power control module 330.

The sync module 310 is configured to synchronize the timing reference of the user terminal 110 with a time base of the wireless communication system. The sync module 310 can be configured with the remaining modules of the user terminal 110, for example, to implement the synchronization techniques described in U.S. patent application Ser. No. 10/428,953. The sync module 310 can be configured to provide a predetermined synchronization accuracy, which may be one the order of, or better than, one CDMA chip.

The transmit timing module 320 can be configured to receive the time epoch assignment and control the transmit path within the user terminal to transmit a data block at a time that allows the data block to be received at the base station at the assigned time epoch. In one embodiment, the transmit timing module 320 receives a time epoch assignment prior to each transmission cycle. In another embodiment, the transmit timing module 320 can receive the initial tie epoch assignment and can determine future time epoch assignments based in part on a predetermined algorithm. The predetermined algorithm may include pseudorandomization of the time epoch assignments. In such an embodiment, the base station would similarly determine the time epoch assignments using a complementary algorithm. In other embodiments, the transmit timing module 320 can be configured to receive the time epoch assignments on less frequent intervals. The frequency may be periodic, such as once very predetermined number of transmission cycles, or may be event based. An example of an event based time epoch assignment is a reassignment of time epochs that coincide with a change in the number of active user terminals accessing the channel.

The randomization or permutation of the time epoch assignments may be determined at the base station and transmitted to the user terminal 110, or may be determined by the transmit timing module 320, particularly if the time epoch assignment is pseudorandom or deterministic.

The transmit timing module 320 may receive a chip assignment and modulus, and may determine the time epoch assignment in conjunction with the sync module 310. In other embodiments, the transmit timing module may receive a time epoch assignment and may use a time offset determined by the sync module in which the data block needs to be transmitted in order to arrive at the base station at the assigned time epoch. The transmit timing module 320 may receive other types of timing information in other embodiments.

The power control module 330 can be configured to instruct the transmitter 350, and more particularly a power amplifier 352 in the transmitter 350, to increase or decrease the transmit power based in part on a power control signal received in a forward link communication.

The transmit data path for the user terminal 110 can include a data buffer 340 that is configured to store the data that is to be transmitted to the base station. The data can include control and overhead signaling and traffic that is to be transmitted over the reverse link, and may originate from one or more sources (not shown). The user terminal 110 retrieves a data block from the data buffer 340 and communicates the data block to a data modulator 342. The data block can be selected from a predetermined set of data block sizes, or may be sized based on the amount of data that the user terminal 110 wishes to transmit, or may be a combination of predetermined block sizes based on an amount of data to be transmitted.

The data modulator 342 can be configured to modulate the data contained within the retrieved data block. The data modulator 342 can be configured, for example, to direct sequence spread the data bits with a predetermined code sequence. The data modulator 342 may use a code generated by a LFSR within the data modulator 342 or may select a code from a predetermined number of codes stored or generated in the user terminal 110. The data modulator 342 can be directed to use a particular code based on an instruction or control signal received from the base station by the receiver 302.

The modulated data is provided to a transmitter 350 that is configured to transmit the signal at a time that is determined to include a time offset that compensates for a propagation delay. The modulated data block is thus configured to arrive at the base station at the assigned time epoch.

A processor 360 in conjunction with processor usable instructions stored in an associated memory 362 can be configured to perform portions or all of one or more of the modules of the user terminal. For example, some or all of the functions of the transmit timing module 320 may be stored as software within memory 362 that is executed by the processor 360.

Figure 4:
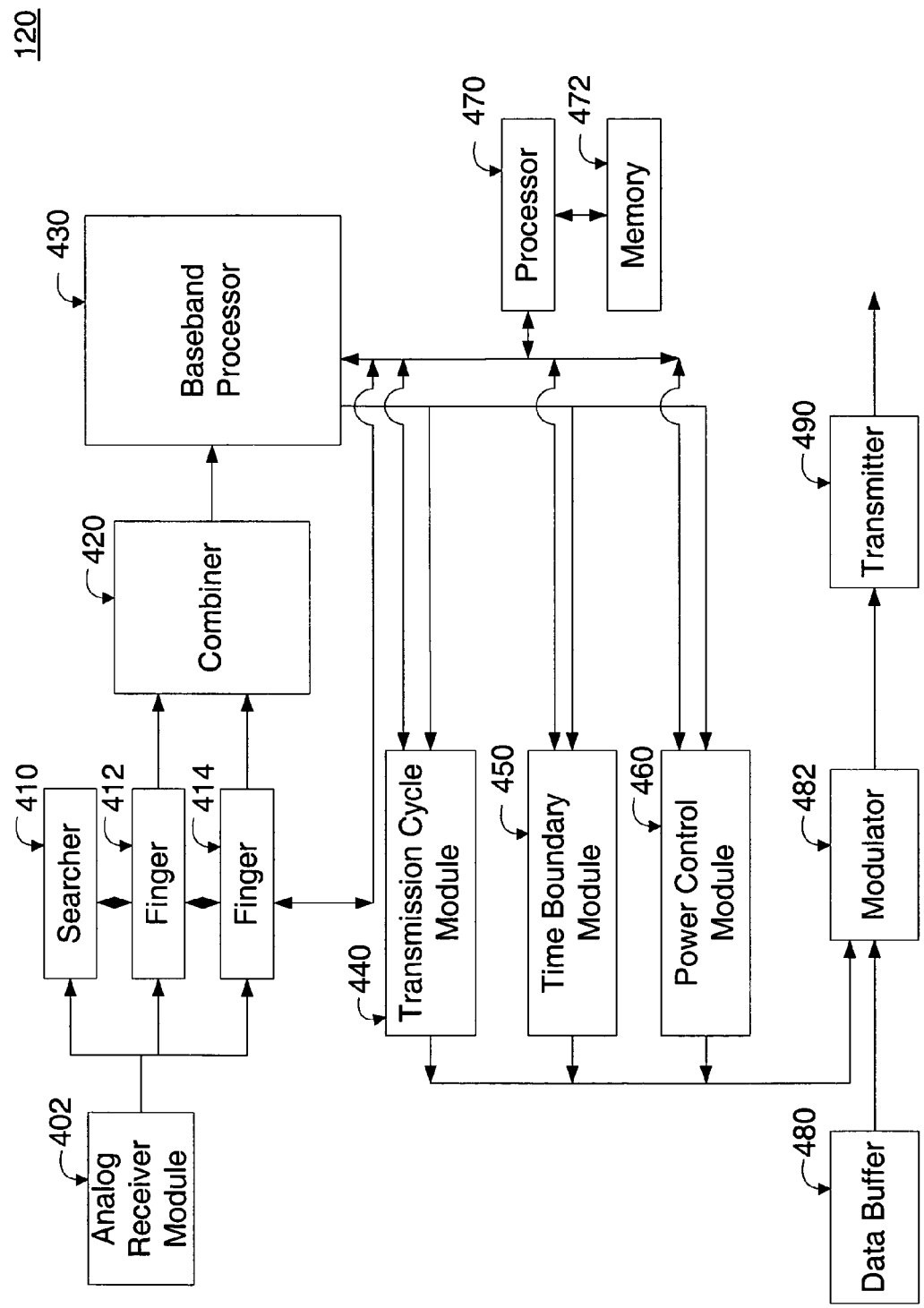
FIG. 4 is a functional block diagram of a user terminal configured to interface with a time constrained access channel of the disclosure.

FIG. 4 is a functional block diagram of an embodiment of a base station 120, which may be the base station of the wireless communication system shown in FIG. 1. Only those portions of the base station 120 that are relevant to the present disclosure are shown and described for the sake of clarity.

The base station 120 can include an analog receiver module 402 that is configured to receive signals broadcast on a random access channel to set up the active session on the constrained arrival time channel. The analog receiver module 402 can also be configured to receive signals broadcast on the constrained arrival time channel. The output of the analog receiver module 402 can be converted to a digital signal for subsequent processing.

The base station can include a RAKE receiver coupled to the output of the analog receiver module 402. The RAKE receiver can include a searcher 410 that is configured, for example, to search for the strongest of potentially several multipath signals arriving from a particular user terminal. The searcher 410 may assign a first multipath signal to a first finger 412 and may assign a second multipath signal to a second finger 414. Although only two fingers 412 and 414 are shown, any number of fingers may be implemented in a RAKE receiver. The searcher 410 may be configured to search for transmission from a particular user terminal depending on the timing. Because each user terminal in the constrained arrival time channel is assigned a time epoch for arrival, the searcher 410 can be configured to search for transmission from the associated user terminal in a time window that encompasses the assigned time epoch. Therefore, for each time epoch, the searcher 410 has knowledge of the user terminal assigned to that time epoch.

Each finger 412 and 414 demodulates the multipath signal assigned to it, for example, by dispreading the signal with a corresponding code. The signal outputs from the various fingers 412 and 414 can be coupled to a combiner 420 where the multipath signals are time aligned and coherently summed. In embodiments where the multipath signals are largely absent, such as where stationary user terminals transmit to a satellite relay station, a RAKE receiver having multiple fingers, 412 and 414, and associated combiner 420 may be omitted. Instead, a single receive path equivalent to a single finger that performs searching and demodulation may be used.

The output of the combiner 420 can be coupled to a baseband processor 430. The baseband processor 430 may couple relevant portions of the data to a BSC (not shown). Additionally, the baseband processor 430 may couple control and overhead signals to associated control modules.

The control modules can include a transmission cycle module 440 configured to determine a duration of the transmission cycle. The transmission cycle module 440 may determine a transmission cycle, for example, based on a number of active user terminals in communication with the base station 120.

The control modules can also include a time boundary module 450 that can be configured to determine a time epoch that represents the time of arrival assigned to a particular user terminal. The time boundary module 450 can also be configured to perform the time epoch randomization or permutation that is used to more evenly distribute the effects of interference across all of the user terminals. The time boundary module 450 can be configured to communicate the time epoch assignments to the processor 470, baseband processor 430, and searcher 410.

The control modules can include a power control module 460 that forms a part of a power control loop. The power control module 460 can determine if the transmit power for a particular user terminal is to be increased or decreased. For example, the baseband processor 430 can determine if the data received corresponding to a time of arrival assigned to a particular user terminal is corrupted. The base station 120 may then transmit a message requesting retransmission of the data. Additionally, the baseband processor 430 may communicate the inability to recover the data to the power control module 460 such that the power control module 460 can generate a control message to the user terminal to instruct the user terminal to increase its transmit power. Such a power control loop is not possible in a random access channel, such as an Aloha channel, because the receiver has no information regarding which user terminals are attempting to transmit data, and such are unable to determine which user terminals are the originators if collisions result in loss or corruption of data. Conversely, the baseband processor 430 may determine that the received data corresponding to a particular user terminal has been received with no errors. The baseband processor 430 may communicate the error free reception to the power control module 460 and the power control module 460 may generate a control message to user terminal to instruct the user terminal to reduce its transmit power. The power control module 460 may determine a power control message based in part on a received signal quality metric, such as a data error rate, a bit error rate or a symbol error rate. The output of the power control module 460 as well as the outputs from the transmission cycle module 440 and the time boundary module 450 can be coupled to a modulator 482.

The modulator 482 is also coupled to a data buffer 480 that is used to store the data that is to be transmitted to each of the user terminals over the forward link channels. The modulator 482 can modulate each of the forward link signals with the appropriate code and can generate overhead signals from the outputs of one or more control modules.

The modulated signal is coupled to a transmitter 490 that is configured to provide the forward link signals to the various user terminals. A processor 470 in conjunction with processor usable instructions stored in an associated memory 472 can be configured to perform portions or all of one or more of the modules of the base station 120.

Figure 5:
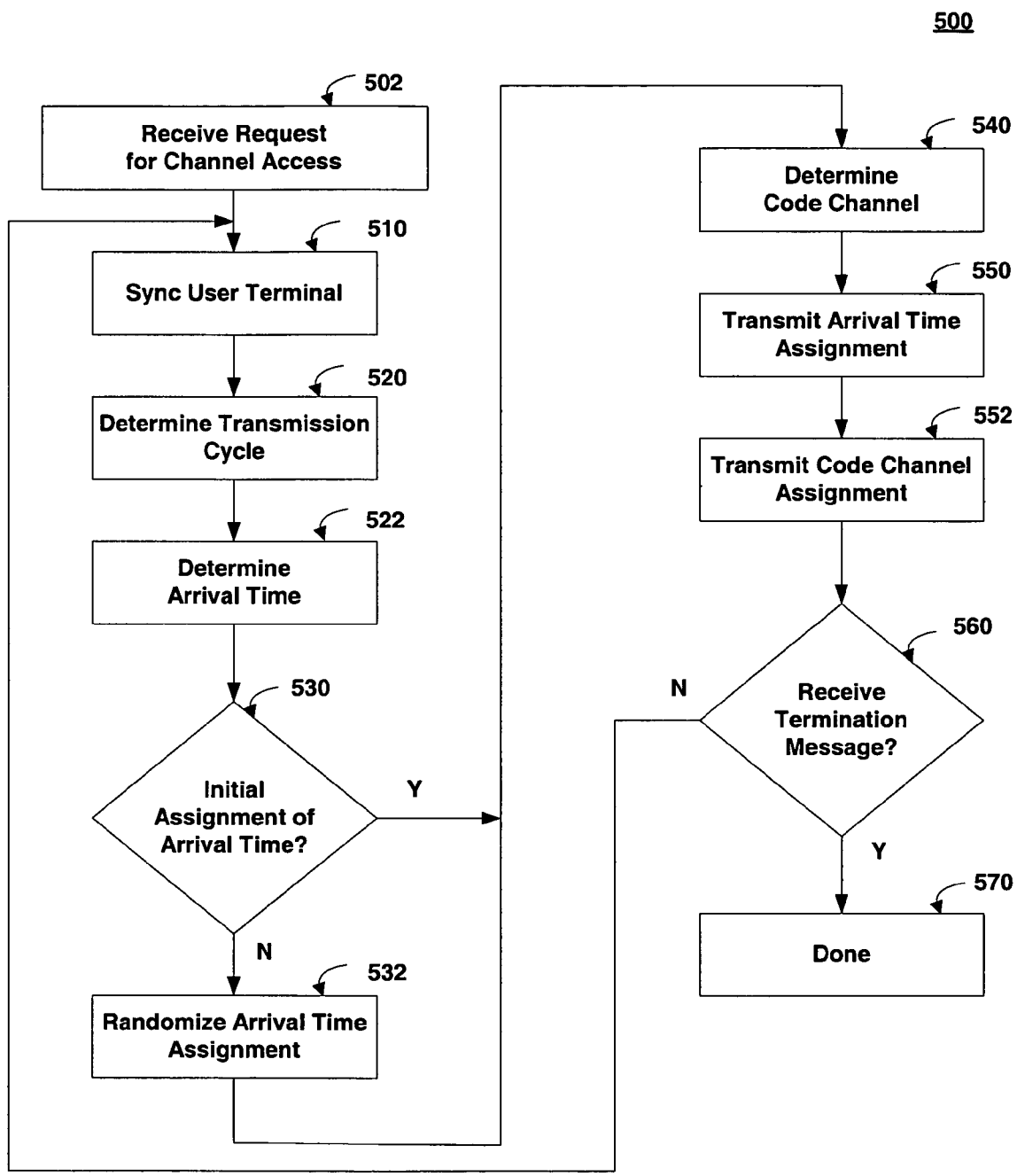
FIG. 5 is a flowchart of an embodiment of a process of allocating a channel.

FIG. 5 is a flowchart of an embodiment of a method 500 of allocating a constrained arrival time channel. The method 500 can be implemented for example, by the base station shown in FIG. 1 or FIG. 4.

The method 500 begins at block 502 when the base station receives a request from a user terminal for channel access. The base station may receive the request from a user terminal, for example, over a CDMA Aloha random access channel that is provided for overhead signaling and communication. The request initiates an active session over the constrained arrival channel.

The base station proceeds to block 510 and synchronizes the user terminal so that the user terminal and base station are synchronized to the same time base. In one embodiment, the user terminal is synchronized with the base station time reference to an accuracy of better than one CDMA chip.

The base station then proceeds to block 520 and determines the transmission cycle for the constrained arrival time channel. As described earlier, the transmission cycle represents the duration between two consecutive transmission arrival times for a particular user terminal. As described earlier, the transmission cycle can be determined based on a number of active user terminals, or can be independent of the number of active user terminals. In one embodiment, the number of time epochs, or time of arrival boundaries, is equal to the number of active user terminals, and thus the transmission cycle is equal to the minimum time increment multiplied by the number of active users. In other embodiments, the transmission cycle can be a fixed duration. Other embodiments may use a combination of techniques. For example, the time duration can be based on the number of active user terminals but can be further constrained to be at least some predetermined minimum transmission cycle duration.

The base station then proceeds to block 522 and determines the arrival time to assign to the user terminal. The arrival time assigned to a particular user terminal may be determined based in part on arrival times assigned to other user terminals. The arrival times may differ by as little as one CDMA chip, or a multiple of chips. In one embodiment, the base station can assign the earliest available arrival time to the user terminal.

After determining the arrival time to assign to the user terminal, the base station proceeds to decision block 530 to determine if the time of arrival previously determined represents the initial assignment for the user terminal. There is the possibility of uneven interference for different users assigned to different arrival times if the assigned arrival times are periodic. Thus, if the arrival time does not represents the initial arrival tie determination, the base station proceeds to block 532 and randomizes the arrival time assignment. The base station may randomize the arrival time assignment and communicate the randomized value to the user terminal. In another embodiment, the base station and user terminal may individually determine the time of arrival based on a predetermined function after the base station communicates the initial time assignment to the user terminal. The base station then proceeds to block 540.

Returning to decision block 530, if the arrival time assignment is the first arrival time assigned to the user terminal, there is no need to randomize the arrival time and the base station may proceed directly to block 540.

In block 540, the base station determines a code channel to assign to the user terminal. The base station may assign a different code channel to the user terminal each transmission cycle to allow multiple user terminals to use the same time of arrival. Typically, the number of codes is limited to reduce the complexity of the receiver in the base station. In other embodiments, all user terminals use the same code and step 540 can be omitted.

The base station proceeds to block 550 to communicate the time of arrival assignment to the user terminal. For example, the base station can communicate the arrival time to the user terminal by signaling over the forward link.

After communicating the arrival time assignment, the base station proceeds to block 552 and communicates the code channel assignment. If all user terminals use the same code assignment, the base station does not need to transmit the code assignment to the user terminal.

The base station proceeds to decision block 560 and determines if the base station receiver has received a termination message from the user terminal. The user terminal may transmit a termination message to indicate a termination of an active session.

If the base station receives the termination message, the base station proceeds to block 570 and the method 500 is done for the user station. Returning to decision block 560, if the base station receiver does not receive a termination message, the base station may conclude that the session remains active. The base station may then return to block 510 to maintain synchronization with the user terminal and to determine the next arrival time to assign to the user terminal. The base station may determine an arrival time each transmission cycle, or may determine an arrival time less frequently. For example, the base station may re-determine an arrival time if the number of active users changes. In other embodiments, the base station may re-determine arrival times after a predetermined number of transmission cycles. Other embodiments may use still other methods.

Figures 6, 7:
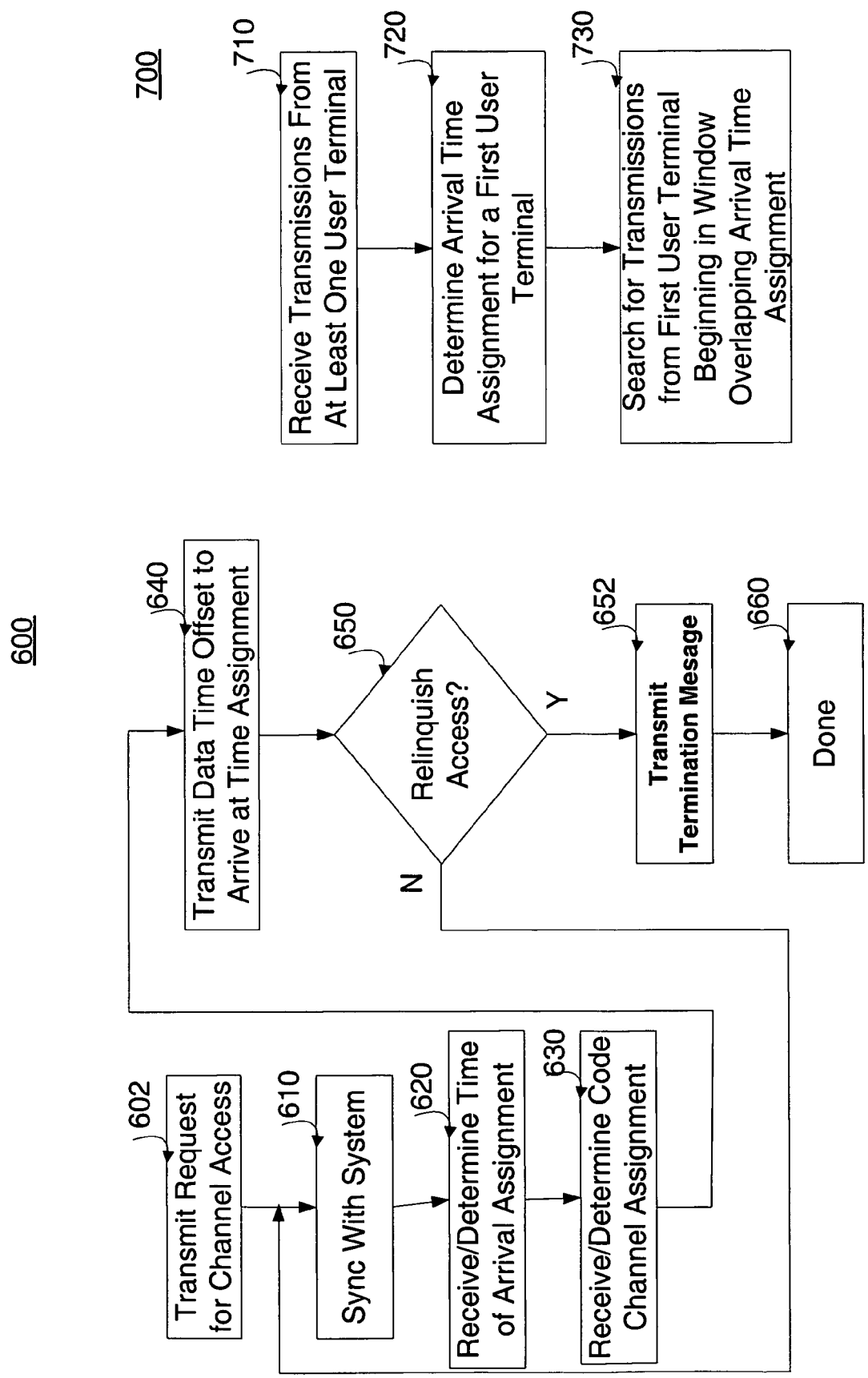
FIG. 6 is a flowchart of an embodiment of a process of operating in a constrained arrival time channel.
FIG. 7 is a flowchart of an embodiment of a process of receiving a signal from a constrained arrival time channel.

FIG. 6 is a flowchart of an embodiment of a method 600 of operating over a constrained arrival time channel. The method 600 may be implemented, for example, within one or more of the user terminals of FIG. 1 or FIG. 3.

The method 600 begins at block 602 when the user terminal transmits a request for channel access to the base station. The user terminal may transmit the request, for example, over a random access overhead channel of the base station.

The user terminal proceeds to block 610 and synchronizes with the base station to establish a common time reference. During the synchronization process, the user terminal may determine an offset in timing that can be used to compensate for a propagation delay.

The user terminal proceeds to block 620 and receives or otherwise determines the time of arrival assignment. The user terminal typically receives the initial time of arrival assignment from the base station. However, subsequent times of arrival may be independently determined by the user terminal. For example, the user terminal may receive a time assignment in terms of chip durations modulo a number of active user terminals. The user terminal can then continue to determine its time of arrival assignment unless there is a change in the assignment or a change in the number of active user terminals. In another embodiment, the user terminal may receive a time of arrival assignment and may determine subsequent times of arrival based on a predetermined function.

After receiving or determining the time of arrival assignment, the user terminal proceeds to block 630 and receives or otherwise determines a code assignment. In systems where the user terminals may use more than one code, the base station may, for example, determine the code channel based on the time of arrival assignment. In other embodiments, the user terminals may all use the same code and may not be assigned a code.

After determining the code, the user terminal proceeds to block 640 and transmits data timed to arrive at the base station at the assigned arrival time. The user terminal transmits the data at a time prior to the assigned time of arrival to compensate for the propagation delay from the user terminal to the base station.

The user terminal may buffer data that is to be transmitted while waiting for its assigned opportunity to transmit. The user terminal may then retrieve some or all of the buffered data and transmit the data such that the data arrives at the base station beginning at the assigned time of arrival. The user terminal may be configured to generate data in one of a predetermined number of data block sizes, or may be configured to generate a variable data block size. The data can be encoded using the assigned code, which may be generated using, for example, a Linear Feedback Shift Register (LFSR).

After transmitting the data, the user terminal proceeds to decision block 650 and determines if it should relinquish its portion of the constrained arrival time channel and terminate the active session. If not, the user terminal proceeds back to block 610 and continues operating over the channel.

Returning to decision block 650, if the user terminal determines that the active session is to be terminated and access to the constrained arrival time channel relinquished, the user terminal proceeds to block 652 and transmits a termination message to the base station. In one embodiment, the user terminal transmits the termination message over the random access overhead channel used by the user terminal for the initial channel access request. In another embodiment, the termination message can be included with the data transmitted over the constrained arrival time channel. After transmitting the termination message, the user terminal proceeds to block 660 and the method 600 is done.

FIG. 7 is a flowchart of an embodiment of a method 700 of receiving a signal from a tie constrained channel. The method 700 can be implemented, for example, within the base station of FIG. 4. The method 700 begins at block 710 where the base station receives, over the constrained arrival time channel, transmissions from at least one active user terminal and typically from a plurality of active user terminals. The base station proceeds to block 720 and determines an arrival time assignment for a particular user terminal from the plurality of active user terminals. The base station then proceeds to block 730 and searches for transmissions from the user in a time window that overlaps the arrival time assigned to the user terminal. The base station may receive multiple transmissions modulated with the same code. However, typically each of the transmissions is configured to have a distinct arrival time assignment. The different signals thus are modulated at starting at different times. If the arrival times are allocated in increments over which there is sufficient cross correlation properties of the code, the base station can recover the transmission from a particular user terminal in the presence of the other signals.

The disclosure outlines a constrained arrival time channel that can eliminate the need for a large number of codes C, hence simplifying the receiver, while at the same time substantially eliminating the probability of collisions. A wireless communication system can implement the channel as part of the reverse link signaling between multiple user terminals and a single base station. The receiver in the base station can be substantially simplified because the number of codes searched for each arrival time is reduced.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of allocating access to a channel, the method comprising:
   determining timing of a transmission cycle of a signal transmission between a transmitter and a user terminal at a destination;
   determining a time of arrival of the signal transmission at the destination within the transmission cycle to assign the determined time of arrival to the use terminal for a plurality of active user terminals; and
   transmitting the determined time of arrival to the user terminal to allocate the channel to the user terminal beginning at the determined time of arrival.

2. The method of claim 1, wherein the determined time of arrival occurs during a time period in which at least one additional user terminal from the plurality of user terminals is transmitting.

3. The method of claim 1, wherein the determined time of arrival occurs within approximately one CDMA chip of a time of arrival assigned to an additional user terminal from the plurality of user terminals that are transmitting.

4. The method of claim 1, wherein the determined time of arrival occurs at least one CDMA chip from a nearest time of arrival assigned to an additional user terminal.

5. The method of claim 1, wherein the determined time of arrival occurs at substantially the same position relative to a beginning of the transmission cycle.

6. The method of claim 1, wherein the transmission cycle comprises a duration that is proportional to a duration of a CDMA chip.

7. The method of claim 6, wherein determining the time of arrival comprises determining a CDMA chip number modulo by a number of chips in the transmission cycle.

8. The method of claim 1, wherein the transmission cycle comprises a duration of time proportional to a number of active user terminals.

9. The method of claim 1, wherein the transmission cycle comprises a fixed duration of time.

10. The method of claim 1, further comprising randomizing the time of arrival within the transmission cycle.

11. The method of claim 1, further comprising:
    determining a code assignment for the user terminal; and
    transmitting the code assignment to the user terminal.

12. A method of allocating access to a channel, the method comprising:
    receiving a request for access to the channel from a user terminal;
    synchronizing a time base with the user terminal'determining a transmission cycle of a signal transmission from the user terminal to a destination having a duration proportional to a CDMA chip duration;
    determining a time of arrival of a signal transmission at the destination occurring at a chip boundary within the transmission cycle; and
    transmitting the determined time of arrival to the user terminal to allocate the channel to the user terminal beginning at the determined time of arrival.

13. A method of transmitting data in a channel, the method comprising:
    requesting access to the channel;
    receiving a time of arrival assignment of a signal transmission at a receiver in response to the request; and
    transmitting a data block to the receiver at a time offset from the assigned time of arrival such that an initial portion of the data block arrives at the receiver at the assigned time of arrival.

14. The method of claim 13, wherein requesting access to the channel comprises requesting access to the channel over a random access channel.

15. The method of claim 14, wherein the random access channel comprises a CDMA Aloha channel.

16. The method of claim 13, wherein receiving the time of arrival assignment comprises receiving a CDMA chip boundary occurring within a transmission cycle of a signal transmission to the receiver.

17. A method of claim 13, wherein receiving the time of arrival assignment comprises receiving a time of arrival assignment occurring substantially one CDMA chip duration from a time of arrival assignment for another user terminal.

18. The method of claim 13, wherein receiving the time of arrival assignment comprises receiving a time epoch assignment modulo a number of active user terminals.

19. The method of claim 13, further comprising encoding the data block with a code used by at least one other user terminal that transmits over the channel at a time that overlaps at least in part an amount of the time required for transmitting the data block.

20. The method of claim 13, further comprising encoding the data block with a code used by a plurality of active user terminals.

21. The method of claim 13, further comprising determining a future time of arrival assignment occurring in a subsequent signal transmission to the receiver based in part on the time of arrival assignment.

22. The method of claim 21, wherein determining the future time of arrival assignment comprises determining a CDMA chip boundary modulo by a number of active user terminals.

23. The method of claim 21, wherein determining the future time of arrival assignment comprises determining a CDMA chip boundary based on a predetermined algorithm.

24. A method of receiving data in a channel, the method comprising:
- determining a time of arrival of a signal transmission from a user terminal at a destination within a signal transmission cycle assigned to the user terminal;
- receiving signal transmissions from a plurality of active user terminals;
- searching within a time window of the signal transmission cycle that includes the determined time of arrival of the signal transmission from the user terminal; and
- receiving a data block from the user terminal within the search time window.

25. The method of claim 24, further comprising:
- determining a received signal quality metric corresponding to at least a portion of the data block;
- determining a power control message based in part on the received signal quality metric; and
- transmitting the power control message to the user terminal.

26. The method of claim 25, wherein the received signal quality metric comprises a symbol error rate.

27. The method of claim 25, wherein the received signal quality metric comprises a bit error rate.

28. An apparatus for operating over a constrained arrival time channel, the apparatus comprising:
- a data buffer configured to store a data block;
- a data modulator coupled to the data buffer, and configured to direct sequence spread data within the data block using a code to produce modulated data;
- a transmitter configured to receive the modulated data from the data modulator and selectively transmit the modulated data; and
- a transmit timing module coupled to the transmitter, and configured to receive an arrival time assignment of a signal transmission from the transmitter at a receiver and control the transmitter to transmit the modulated data at a time offset relative to the arrival time assignment such that the transmitted data initially arrives at the receiver at substantially the arrival time assignment.

29. The apparatus of claim 28, wherein the data modulator comprises a Linear Feedback Shift Register (LFSR) configured to generate the code.

30. The apparatus of claim 28, wherein the arrival time assignment comprises a CDMA chip boundary occurring within a transmission cycle.

31. The apparatus of claim 28, further comprising a local receiver configured to receive the arrival time assignment and communicate the arrival time assignment to the transmit timing module.

32. The apparatus of claim 28, further comprising a sync module configured to synchronize the transmit timing module to a system time reference.

33. An apparatus for operating over a constrained arrival time channel, the apparatus comprising:
- a transmission cycle module configured to determine a transmission cycle timing of a signal transmission from a user terminal to a receiver at a destination;
- a time boundary module configured to determine a arrival time of the signal transmission at the destination within the transmission cycle of the user terminal; and
- the receiver configured to receive a plurality signal transmissions from a plurality of active terminals, and configured to search the plurality of signal transmissions within a time window that encompasses the determined arrival time of the signal transmission from the user terminals.

34. The apparatus of claim 33, wherein the transmission cycle module determines the transmission cycle timing of the signal transmission from the user terminal to the receiver having a duration substantially equal to a duration of a number (D) of CDMA chips.

35. The apparatus of claim 34, wherein the time boundary module determines the arrival time of the signal transmission from the user terminal comprising a CDMA chip boundary.

36. The apparatus of claim 34, wherein the time boundary module determines the arrival time of the signal transmission from the user terminal comprising a CDMA chip boundary modulo D.

37. The apparatus of claim 33, wherein the plurality of transmissions comprises a plurality of time overlapping transmissions encoded with a same code.

38. The apparatus of claim 37, wherein the plurality of time overlapping transmissions comprise a plurality of overlapping transmissions, each having a distinct time of arrival assignment of the signal transmission at the reciver.

39. One or more processor readable storage devices configured to store one or more processor usable instructions, when executed by the processor, performing the method comprising:
- receiving a request for access to a channel from a user terminal;
- synchronizing a time base with the user terminal;
- determining a transmission cycle of a signal transmission from the user terminal to a destination having a duration proportional to a CDMA chip duration;
- determining a time of arrival of the signal transmission at the destination occurring at a chip boundary within the transmission cycle; and
- transmitting the determined time of arrival to the user terminal to allocate the channel to the user terminal beginning at the determined time of arrival.

* * * * *